(12) United States Patent
Patton (10) Patent No.: US 8,276,377 B2
(45) Date of Patent: Oct. 2, 2012

(54) METHOD AND APPARATUS FOR CONVERTING ENERGY IN A MOVING FLUID MASS TO ROTATIONAL ENERGY DRIVING A TRANSMISSION

(76) Inventor: Roland Wayne Patton, Sidney (CA)

( * ) Notice: Subject to any disclaimer, the term of this patent is extended or adjusted under 35 U.S.C. 154(b) by 742 days.

(21) Appl. No.: 12/379,578

(22) Filed: Feb. 25, 2009

(65) Prior Publication Data

US 2009/0211240 A1    Aug. 27, 2009

Related U.S. Application Data

(60) Provisional application No. 61/064,262, filed on Feb. 25, 2008.

(51) Int. Cl.
*F03C 1/00* (2006.01)
*F03B 13/10* (2006.01)

(52) U.S. Cl. ............. 60/504; 60/507; 290/42; 290/53
(58) Field of Classification Search ............ 60/504, 60/506, 507; 290/42, 53
See application file for complete search history.

(56) References Cited

U.S. PATENT DOCUMENTS

| 4,145,885 | A |   | 3/1979  | Solell        |        |
|-----------|---|---|---------|---------------|--------|
| 4,242,593 | A | * | 12/1980 | Quilico et al.| 290/53 |
| 5,027,000 | A | * | 6/1991  | Chino et al.  | 290/53 |
| 5,359,229 | A | * | 10/1994 | Youngblood    | 290/53 |
| 5,424,582 | A | * | 6/1995  | Trepl et al.  | 290/53 |
| 5,889,336 | A | * | 3/1999  | Tateishi      | 290/53 |
| 6,803,670 | B2| * | 10/2004 | Peloquin      | 290/53 |

* cited by examiner

*Primary Examiner* — Hoang Nguyen
(74) *Attorney, Agent, or Firm* — Antony C. Edwards (57) ABSTRACT

Three bodies interact to drive a transmission having a pair of one-way clutches coupling a single length of drive chain or other elongate flexible member to an intermeshed pair of counter rotatable gears so as to drive a primary shaft in a single rotational direction. The three bodies are a fixed body, a floating body, and a suspended and usually submerged weighted body. The three bodies are interconnected by the single length of the elongate flexible member and are spaced apart there along. The weighted body is mounted at one end of the elongate flexible member. The primary shaft is mounted above the surface of a moving fluid mass to either the fixed or floating body. The end of the flexible member opposite to the weight is mounted to the other of the fixed or floating body.

11 Claims, 8 Drawing Sheets

METHOD AND APPARATUS FOR CONVERTING ENERGY IN A MOVING FLUID MASS TO ROTATIONAL ENERGY DRIVING A TRANSMISSION

CROSS REFERENCE TO RELATED APPLICATION

This application claims priority from U.S. Provisional Patent Application No. 61/064,262 filed Feb. 25, 2008 entitled. Method and Apparatus for Converting Energy in a Moving Fluid Mass to Rotational Energy Driving a Transmission, and from Canadian Patent Application No. 2,622,284 filed Feb. 25, 2008 entitled. Method and Apparatus for Converting Energy in a Moving Fluid Mass to Rotational Energy Driving a Transmission.

FIELD OF THE INVENTION

This invention relates to the field of motors for converting energy from ocean waves, tides or other moving bodies of water or other fluids to mechanical work, and in particular to converting the energy found in such moving fluid masses to rotational energy so as to drive a transmission which in turn may drive a generator or the like.

BACKGROUND OF THE INVENTION

As stated by Solell in U.S. Pat. No. 4,145,885 which issued Mar. 27, 1979 for a Wave Motor, it is known that the energy in the sea constitutes a vast reservoir of energy which has remained largely untapped to the present time. In that patent Solell proposes a wave motor which includes a float, a displaceable member coupled to the float so as to be displaceable by the ascent and descent of the float, a pair of shafts, and a transmission including a pair of one-way clutches coupling the displaceable member to the shafts to rotate one in one direction during the ascent of the float and to rotate the other in the opposite direction during the descent of the float. In particular, Solell discloses that the displaceable member is a wheel that is rotated in opposite directions by the ascent and descent of the float, or that may be a rack which is moved upwardly by the ascent of the float and downwardly by its descent.

The Solell patent, the floats float on the exposed surface of the ocean waves and in applicant's view are therefore exposed to the waves' action. In the embodiment depicted in FIGS. 1-3 of the Solell patent, the operation of the wave motor is reliant on a consistent or predominant wave direction, it being applicant's opinion that if the wave direction changes for example, to a direction which is at right angles to the consistent or predominant wave direction, the counter rotation by the then out of phase rise and fall of the pair of floats may jam or greatly reduce the consistent operation of the wave motor. In the embodiment of FIGS. 5 and 6 in the Solell patent, a single float drives a corresponding vertically translating rack so as to rotate the pair of shafts via the one-way clutches. Again, the float floats on the exposed surface of the waves and, in applicant's opinion, may be subject to considerable battering which may impair its function over time.

SUMMARY OF THE INVENTION

In the present invention, three bodies interact to drive a transmission having a pair of one-way clutches coupling a single length of drive chain or other elongate flexible member to an intermeshed pair of counter rotatable gears so as to drive a primary shaft in a single rotational direction. A first gear of the pair of gears is mounted on the primary shaft, and a second gear of the pair of the intermeshed gears is mounted on a secondary shaft adjacent and parallel to the primary shaft. The pair of one-way clutches are mounted on each of the ends of the two shafts.

The three bodies required for the operation of the present invention are a fixed body, a floating body, and a suspended and usually submerged weighted body. The three bodies are interconnected by the single length of the elongate flexible member and are spaced apart there along. The weighted body, which may simply be a weight, however could be a spring or other device, is mounted at one end of the elongate flexible member. The elongate flexible member extends upwardly from the weight and follows the shape of an inverted "u" as it extends over, so as to be coupled with, the pair of one-way clutches which are mounted on the ends of the primary and secondary shafts. The pair of clutches are spaced apart in a planar arrangement in the vertex of the inverted u-shaped flexible member. The primary and secondary shafts are mounted to a second body above the surface of the moving fluid mass, and the end of the flexible member opposite to the weight is mounted to a third body disposed underneath the second body.

In one embodiment, the second body is a floating structure and the third body is an anchor resting in a fixed position underneath the floating structure such that movement of the moving fluid mass, which may for example be the ocean, causes the floating structure to translate in a direction having a predominately vertical direction. As the floating structure oscillates predominately vertically, during its ascent the length of the flexible member extending between the floating structure and the anchor lengthens, thereby shortening the length of the flexible member between the floating structure and the weight, it being understood that the elongate flexible member is substantially inelastic and therefore of a substantially fixed length. In this embodiment then the transmission, and in particular its exposed pair of one-way clutches, are mounted high enough up on the floating structure to minimize battering by the waves, and the weight and the anchor remain submerged, again, to minimize the battering effect of waves travelling on the surface of the moving fluid mass. On the ascent of the floating structure, the flexible member drives one of the one-way clutches to rotate its corresponding shaft in one direction and rotates the other one-way clutch and corresponding shaft in the opposite direction during the descent.

In a second embodiment, the second body is a fixed structure mounted above the surface of the moving fluid mass, and the third body is a float riding on the surface of the moving fluid mass. The transmission is mounted onto the fixed structure, that is, the second body, so as to once again be mounted high enough to be up out of the way of interference by the waves. The transmission operates in the same fashion as described for the first embodiment, and differs from the teaching of Solell in his U.S. Pat. No. 4,145,885 described above, in at least that the use of the suspended weight allows the operation of the transmission no matter which direction the waves are moving relative to the fixed structure and float.

Thus as may be seen by an understanding of the first and second embodiments of the present invention, it is the use of the weight, or other suspended weighted body, that enables the relative movement between the first, second and third bodies as the fluid mass moves or swells (or is otherwise elevated, rises and falls or such other hydraulic actuation) to drive the drive chain or other flexible member riding over the pair of one-way clutches, the weight tensions the chain while suspended either above-surface or subsurface, and enables the drive chain to continuously drive the primary and secondary shafts via the clutches resulting in a continuous rotation of the primary shaft in a useful rotational direction so as to for example drive an electrical generator or otherwise to provide work.

The relative movement between the first, second and third bodies provides for an upward stroke of the weight as the distance between the second and third bodies lengthens and provides for a downward stroke of the weight as the distance between the second and third bodies shortens as the moving body of fluid swells and subsides respectively. The hydraulic energy in the swelling or otherwise elevation of the surface of the fluid mass provides the energy to raise the weight, and then as the surface of the fluid mass falls, the weight falls correspondingly thereby tensioning the flexible member over the one-way clutches as the change in relative position between the three bodies causes the rotation of the one-way clutches and the corresponding rotation of either the primary shaft directly with the secondary shaft being free running or of the primary shaft indirectly as driven by the driven rotation of the secondary shaft driving the pair of intermeshed gears which thereby drive the primary shaft in its useful rotational direction.

DETAILED DESCRIPTION OF EMBODIMENTS OF THE INVENTION

Figure 1:
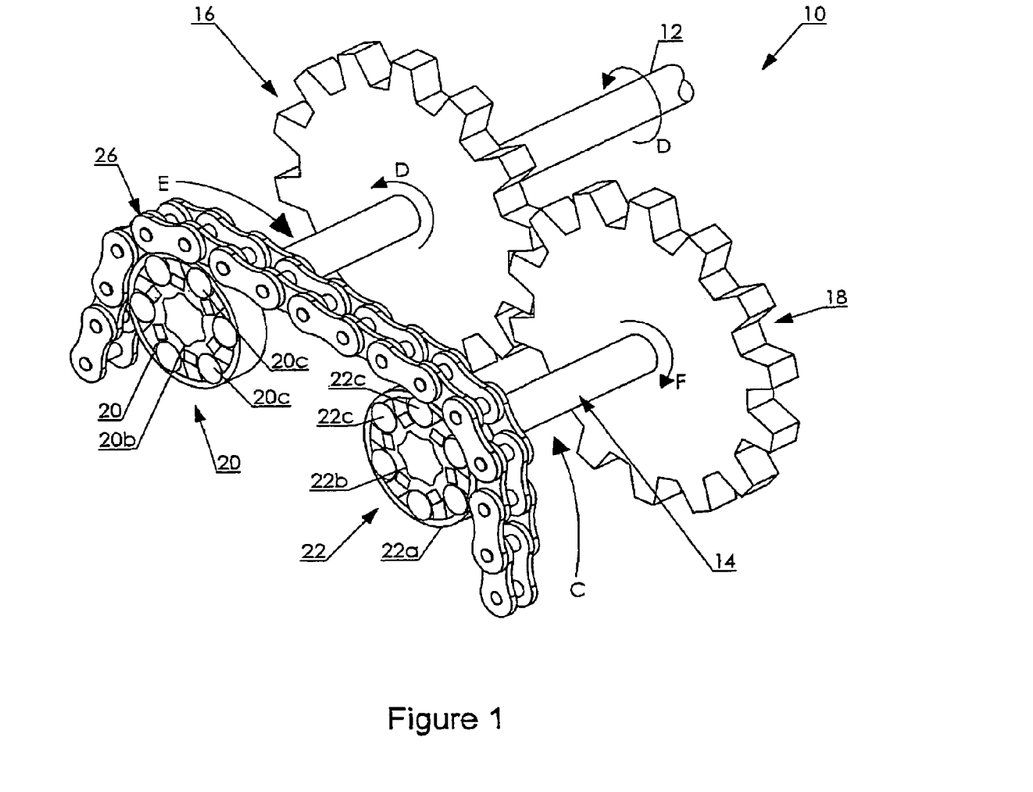
FIG. 1 is, in perspective partially cut-away view, the one-way clutch and one-way gear drive mechanism according to one aspect of the present invention.

As seen in FIG. 1, in one embodiment, the transmission 10 includes a primary shaft 12 mounted in appropriate bearings (not shown), and an adjacent and parallel stub shaft or secondary shaft 14 also mounted in appropriate bearings (not shown). A pair of intermeshed gears 16 and 18 are mounted on shafts 12 and 14 respectively and intermeshed so that rotation of one causes rotation of the other. A pair of one-way clutches 20 and 22 are mounted onto the ends of shafts 12 and 14 respectively and in particular to the ends of those shafts which are exposed from a housing or gear box 24 as better seen by way of example in FIG. 2. As illustrated, one-way clutches 20 and 22 are, respectively, although generally referred to herein as clutches, a clockwise overrunning clutch and sprocket, and a counter clockwise over running clutch and sprocket.

As is known in the art, in the one form of one-way clutch which is illustrated, and which is not intended to be limiting, each clutch includes an outer body in the form of a ring 20a and 22a which may be a sprocket usually having teeth or the like (not shown) for mating with an elongate flexible member such as drive chain 26. An inner ratchet mechanism 20b and 22b are respectively mounted rotatably within rings 20a and 22a. The ratchets are each mounted rigidly to the ends of the corresponding shafts 12 and 14 and are coupled to the corresponding outer rings 20a and 22a by a radially spaced apart array of balls 20c and 22c radially spaced apart around and between rings 20a and 22a, and inner ratchet mechanisms 20b and 22b. As would be known to one skilled in the art, rotation of the outer rings relative to the inner ratchet mechanisms tend to wedge the corresponding balls between the outer ring and inner ratchet thereby effecting a coupling between the outer ring and the corresponding inner ratchet as the outer ring rotates first in a direction which compresses the balls into engagement with the ratchet mechanism and decouples the ring from the ratchet mechanism when the outer ring rotates in the opposite direction leaving thereby the outer ring to be free running with respect to the ratchet.

Figure 2:
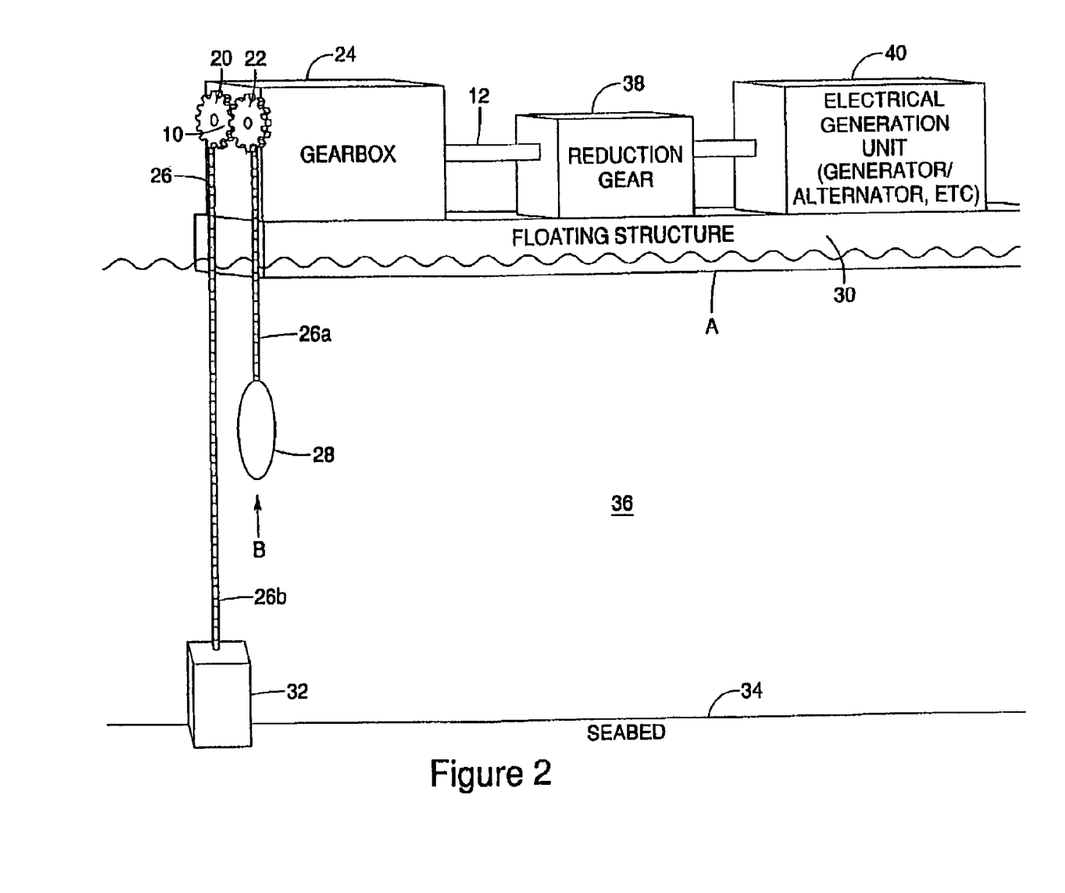
FIG. 2 is a diagrammatic view of one embodiment of a power generation system according to the present invention employing an anchor weight and a suspended weight at opposite ends of the transmission drive chain.

Thus in the embodiment of FIG. 2, a first weighted body or weight 28 is mounted to the first end 26a of chain 26, transmission 10 is mounted on or in gear box 24 which itself is mounted on a floating second body such as floating structure 30, and a third body such as anchor 32 is mounted at the second end 26b of chain 26 so as to rest on sea bed 34. Thus as the fluid mass such as ocean 36 swells or other wise hydraulically elevates floating structure 30 in direction A, weight 28 is also elevated in direction B and chain 26 runs in direction C, as seen in FIG. 1, over one-way clutches 20 & 22. As one-way clutch 20 is a clockwise overrunning clutch and one-way clutch 22 is a counterclockwise overrunning clutch, the corresponding rotation of the one-way clutches as chain 26 translates in direction C, causes balls 20c to jam between ratchet 20b and outer ring 20a to thereby cause driven rotation of shaft 12 in direction D while outer ring 22a of one-way clutch 22 freewheels or overruns so as to not cause rotation of shaft 14. Rotation of shaft 12 in direction D causes a corresponding rotation of gear 16 also in direction D as gear 16 is rigidly mounted onto shaft 12. Because gear 16 is intermeshed with gear 18, rotation of gear 16 in direction D causes counter rotation of gear 18. Counter rotation of gear 18 causes corresponding counter rotation of shaft 14. Counter Rotation of shaft 14 causes counter rotation of ratchet 22b which is freewheeling within freely overrunning outer ring 22a.

As the swell of ocean 36 subsides so that floating structure 30 descends in a direction opposite to direction A, causing weight 28 to translate in a direction opposite to direction B, chain 26 runs in direction E, again as seen in FIG. 1, over one-way shafts 20 and 22. Running of chain 26 in direction E over the one-way clutches, causes the clutch mechanism of one-way clutch 22 to engage, that is, balls 22c jam between ratchet 22*b* and outer ring 22*a* so as to cause corresponding rotation in direction F of shaft 14 and gear 18. Rotation of gear 18 in direction F also causes rotation of gear 16 in direction D which correspondingly rotates shaft 12 in direction D, thereby providing continuous unidirectional rotation of shaft 12 to allow useful work to be extracted from shaft 12 for example by the operation of reduction gears 38 electrical generation unit 40.

Figure 2A:
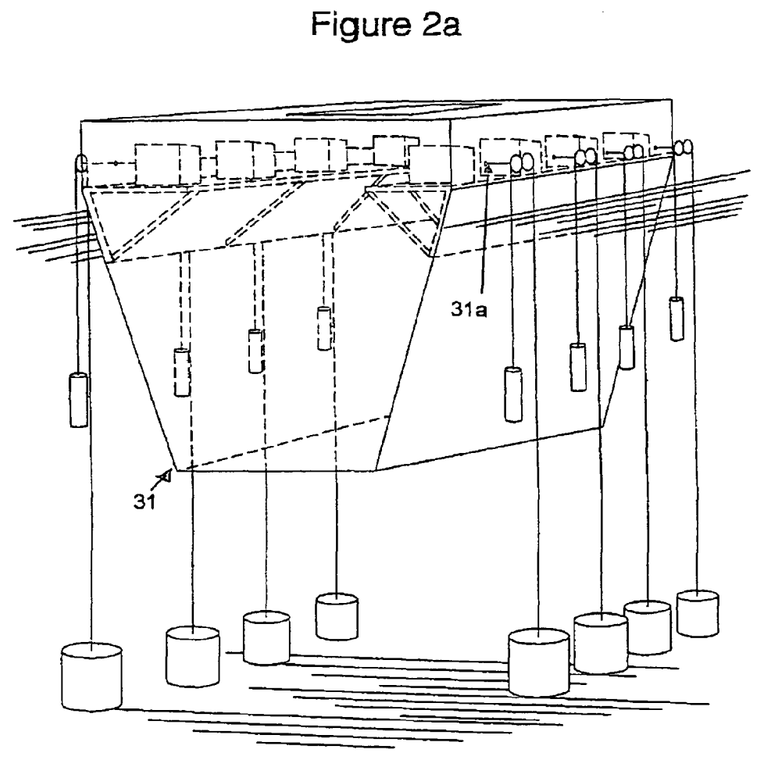
FIG. 2a is a perspective diagrammatic view of a large scale pontoon having a multiplicity of the power generation units of FIG. 2 mounted thereto, and wherein the corresponding generators are mounted within the water-tight pontoon.

In FIG. 2*a* a floating structure such as water tight pontoon 31, that is which has a hull which is enclosed on all sides, as well as on the top and bottom. Electrical generators are housed within the pontoon. Pontoons 31 are positioned in areas where ocean swells would be the main source of vertical movement. Shafts as per the embodiments of FIGS. 1 and 2 extend from the generators through the pontoon walls to the outside. The shafts are supported by bearings 31*a*, and extend as far enough to afford clearance from contact with the wall of the structure. The walls of the hull, below the point where the shafts extend to the outside, are slanted inwardly under the hull to a degree useful to prevent the drive chain 26 or other flexible member from contacting said hull, the actions of ocean swells presumably causing rolling motions and horizontal movements of the hull or pontoon which is held in place by the anchors 32 on/in the sea bed 34.

Total displacement of water would be the sum of the weight of the pontoon, the weight of the mechanical components 24, 38, 40, and the weights 28 attached to the chains 26. The mechanical components are mounted to platforms 33 attached along the inner sides of the walls, and braced by braces 33*a* for stability. The amount of freeboard (distance from surface of water to top of structure) is calculated to allow free access to the mechanical components, yet minimize the effect of wind moving the pontoon horizontally. Sealed hatched 30*b* located in the top of the pontoon provide access. The amount of power produced may be varied, with variable being the number and size of generators, etcetera, the draft, beam and length of the pontoon. This embodiment may be retro-fitted to other existing floating structures, such as used barges, hulls from de-commissioned ships or other existing floating structures.

Apart from the driving of transmission 10 by the operation of ocean swells, the rise and fall of the tides may also operate to drive transmission 10 thereby provide for usable work being provided by shaft 12.

For example in an ebb tide, as the tide recedes, floating structure 30 descends and free weight 28 at end 26*a* of chain 26 pulling downwardly under the force of gravity urges one of the pair of one-way clutches to rotate its corresponding shaft while being free running over the other clutch. Another example would be during a flood tide so that as the tide changes and starts to flood floating structure 30 starts to ascend and anchor 32 on sea bed 34 then tensions chain 26 so as to cause translation of the chain in an opposite direction thereby reversing the operation of the pair of clutches. That is, the drive clutch during the descent of the floating structure becomes the returning clutch and the clutch which was the free turning clutch during the descent of the floating structure becomes the driving clutch. Thus during both the ebb tide and flood tide as the floating structure correspondingly descends and ascends, the pair of one-way clutches operate to drive shaft 12 continuously in a single rotational direction.

With respect to floating structure 30, it may be a free floating or a tethered floating structure including such things as floating marinas or docks, barges, house boats, such examples not intending to be limiting.

Figure 3:
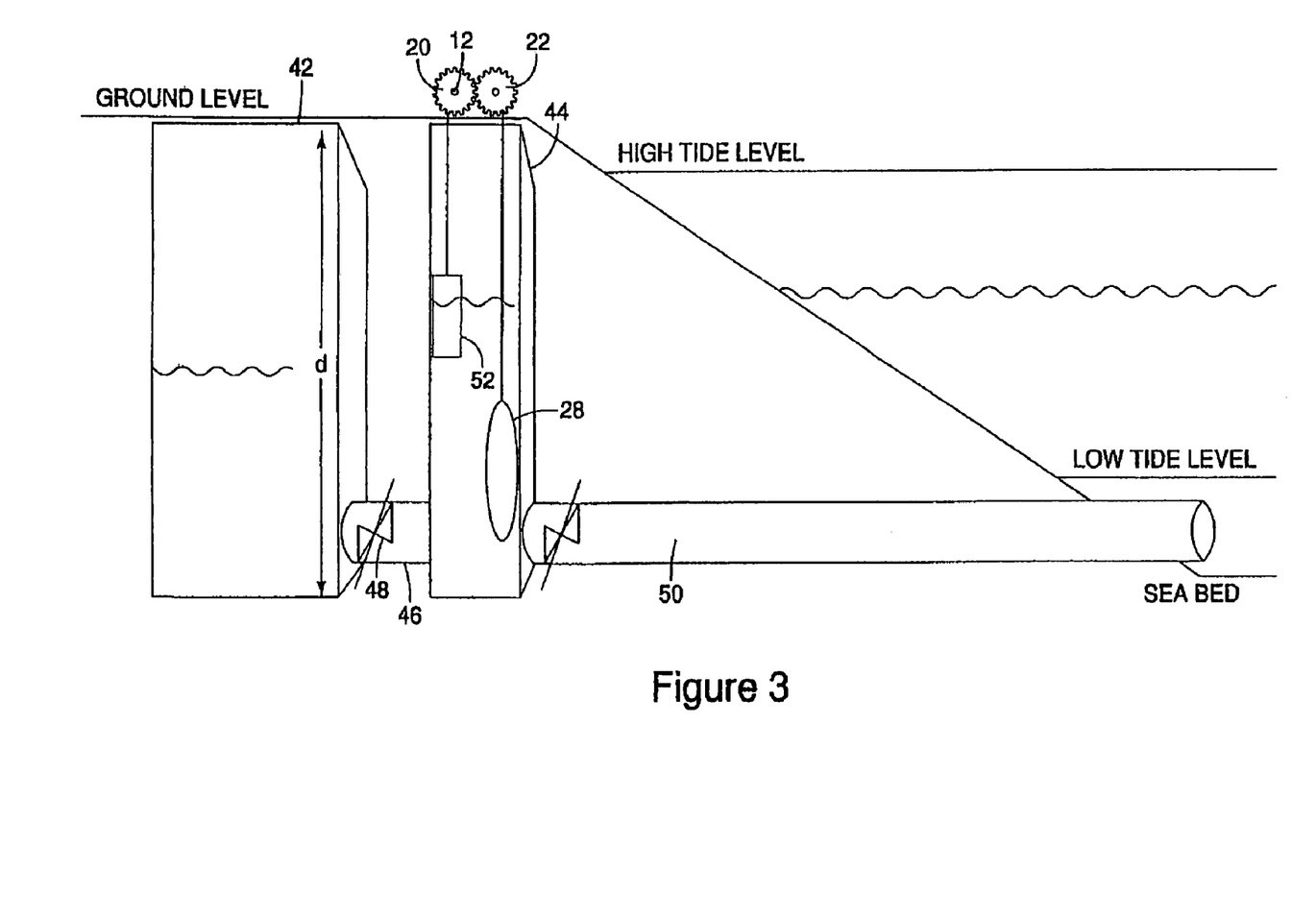
FIG. 3 is, in perspective view, a further embodiment of a power generation system according to the present invention employing a tidal tank, an equalization tank, and a low tide level supply pipe.

In some coastal areas tidal flats occur at low tide. In order to capture the full height of a tide, as seen in FIG. 3, instead of a power generating unit built out to sea, a long distance from the shoreline potentially creating a hazard to navigation, a shore-based system is provided for locating the power generating apparatus on the shore. Because of the slow-moving nature of the tides, equalization tank 42 may be used to increase the total vertical distanced (see FIGS. 4*a*-4*d*). The following describes the construction process:

A hole is dug to the appropriate depth below drying level and a vertical tidal tank 44 built. The tidal tank has a first volume. Equalization tank 42 is built adjacent to the tidal tank 44. The equalization tank has a second volume which is greater than the first volume. The two tanks are connected by a pipe 46 and water flow is controlled by a valve. A second pipe 50 is connected to the outlet of the tidal tank and extends out to open water to just past the low tide level (See FIG. 3). The size of the tidal tank is sufficient to accept a float 52 and counterweight 54 sized to power the generating device 40 (not shown). The diameter of the horizontal pipes 46 and 50 is sufficient to allow the tidal tank and equalization tank to fill and empty at the speed of the tidal ebb and flow.

Figure 4A:
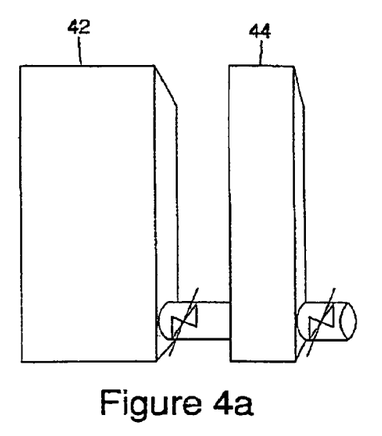
FIG. 4a is the system of FIG. 3 showing initial filling of the tidal tank.
Figure 4B:
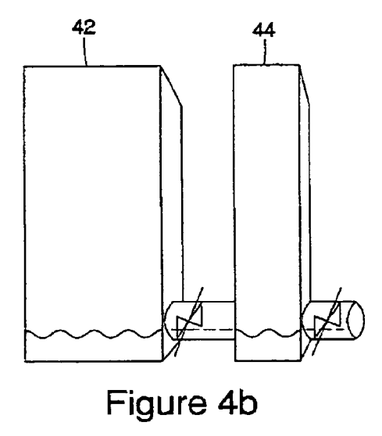
FIG. 4b is the system of FIG. 3 showing filling of the equalization tank from the tidal tank.

During the flood tides, as the tide floods, the float rises and the counterweight forces the chain to rotate the pair of one-way clutches 20, 22 to thereby rotate shaft 12. As the tidal tank fills to Level A, the valve from the sea to the tidal tank closes, preventing further ingress of sea water. The valve between the tidal tank and the equalization tank opens, allowing the water to flow from the tidal tank into the equalization tank until the level of the two tanks equalizes at Level B. This causes the float to drop in the Tidal Tank and the counterweight to rise, turning the clutches 20, 22 in the opposite direction. This again causes shaft 12 to rotate.

Figure 4C:
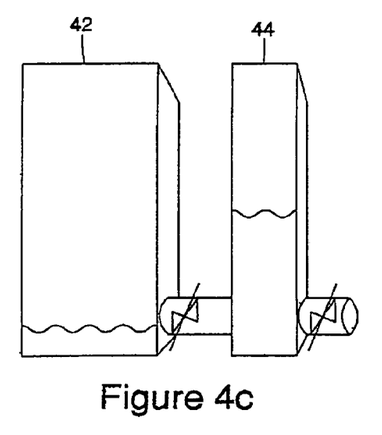
FIG. 4c is the system of FIG. 3 showing further filling of the tidal tank to the level of the rising tide.
Figure 4D:
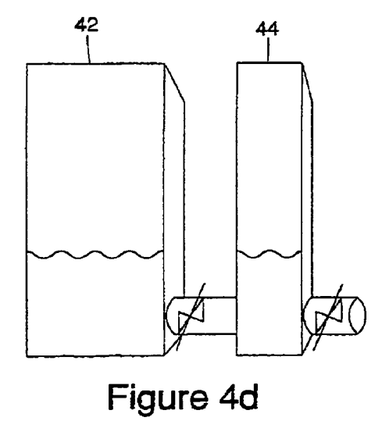
FIG. 4d is the system of FIG. 3 showing the further filling of the equalization tank from the tidal tank.

Once the tank levels equalize, the equalization tank valve closes and the sea water valve opens and water continues to flow into the Tidal Tank until it reaches Level C which is higher than Level A because of the incoming tide. Then the sea water valve closes and then the equalization tank valve opens allowing the water to flow into the equalization tank until the two tanks once again equalize at Level D.

Each time the water rises or falls in the Tidal Tank it causes the shaft to rotate. The use of an equalization tank significantly increases to total vertical movement—the larger the equalization tank—the greater the increase in vertical tide movement. An equalization tank of double the surface area of the Tidal Tank almost triples the vertical distance the water rises and falls within the Tidal Tank. By of analogy then the tidal tank acts as a cylinder and the reciprocating motion of the float on the end-weighted chain as a piston reciprocating in the cylinder.

During the ebb tide, with both valves closed, the level of the water in the tidal tank lowers to a pre-determined level. The sea valve closes, then the equalization tank valve opens and water from the equalization tank moves into the Tidal Tank until the water level in both tanks equalizes. Every time the water in the Tidal Tank lowers and then rises, alternatingly ascending and descending, it causes shaft 12 to rotate.

This permits a tidal power unit to operate during times when sea ice or other severe weather conditions would make other systems difficult or impossible to continue to operate. Pure vertical tidal power (disregarding swells and waves) is predictable using this system. Time intervals between valve changes can be altered to suit the tidal profile in any chosen area. Size of equalization tank, if used, can be sized according to the tidal profile in order to optimize the activation of the generating device.

In some regions the size of the vertical tide may not be sufficient to provide sufficient rpm's to activate an electrical generating unit. As an example of tide differences, the tide characteristics of 2 locations in Canada were compared on the same day. The tidal change in the west coast location was about 6 feet per cycle, while that on the east coast location was about 20 feet.

Figure 6:
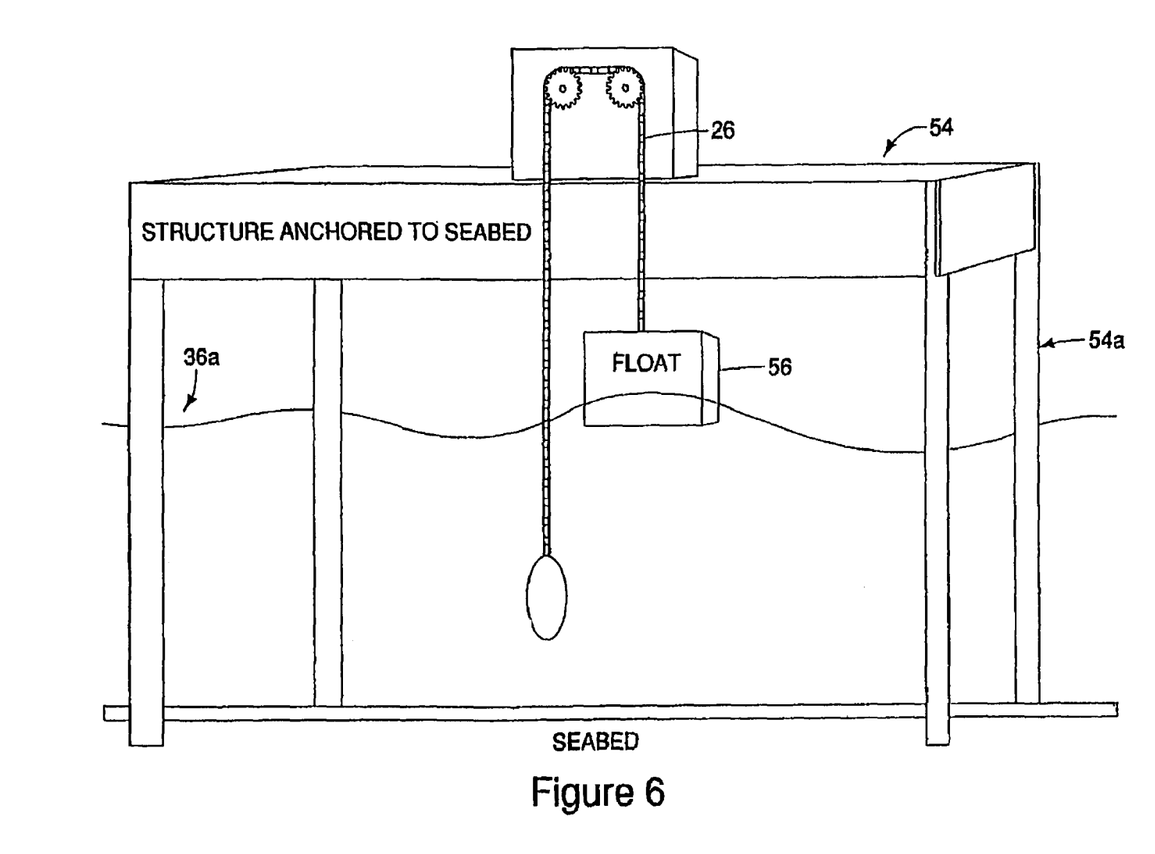
FIG. 6 is a perspective view of a suspended weight and float mounted on opposite ends of a drive chain driving a transmission mounted on a fixed structure fixed over the ocean.

In addition to an equalization tank, a solution would be to use springs which could be wound up to a predetermined tension, after which the power could be transferred to the shaft. Using multiple gearboxes, the springs could be wound up to be released at different times. In this way a more constant delivery of electricity could be achieved.

Where multiple units are needed to ensure a more consistent source of power, for example when springs are used to store the potential energy, and sequenced to discharge at different intervals, a single float could be used to connect the multiple units as seen in FIG. 6.

Figure 5:
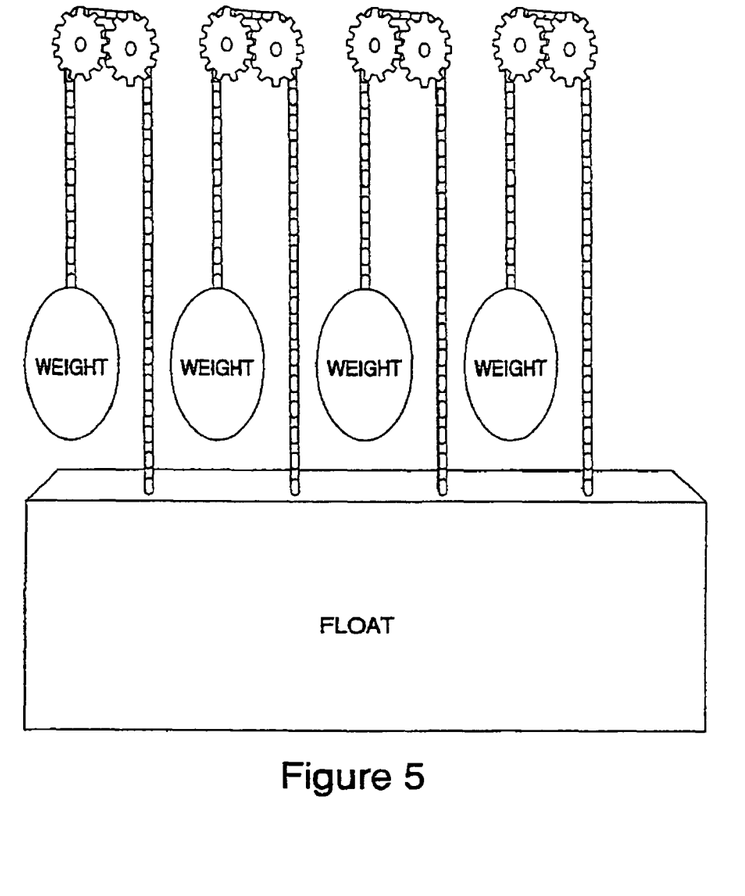
FIG. 5 is a partially cut-away perspective view of a multiple chain driven transmission according to one aspect of the present invention wherein the weight may in one embodiment be suspended on the exterior of a tank containing the float.

If a tank is located ashore, the weights may be suspended outside the tank so that only the float contacts the water.

In the application shown in FIG. 6, the structure 54 is fixed to the shore or seabed for example on pilings 54a or other such supports. Fixed structure 54 may include oil rigs, bridge foundations exposed to ocean swells/waves, marinas or other fixed structures supported by vertical pilings, or other structures constructed specifically for electrical generation. The buoyancy to couple the energy of a swell or wave is provided by a separate float 56 and the weight 28 hangs at the other end of the chain 26. As the swell or wave 36a moves from the peak to the trough, the float moves downward, activating the clockwise overrunning clutch to move the shaft in a clockwise direction, transferring this power through the reduction gear to the electrical generating unit. As the swell or wave continues, the float moves from the trough to the peak. This moves the float upwards, causing the chain to produce counterclockwise movement in the overrunning clutches. This now causes the counterclockwise overrunning clutch to engage the device and move the shaft in a clockwise direction to drive the electrical generating unit.

Figure 7:
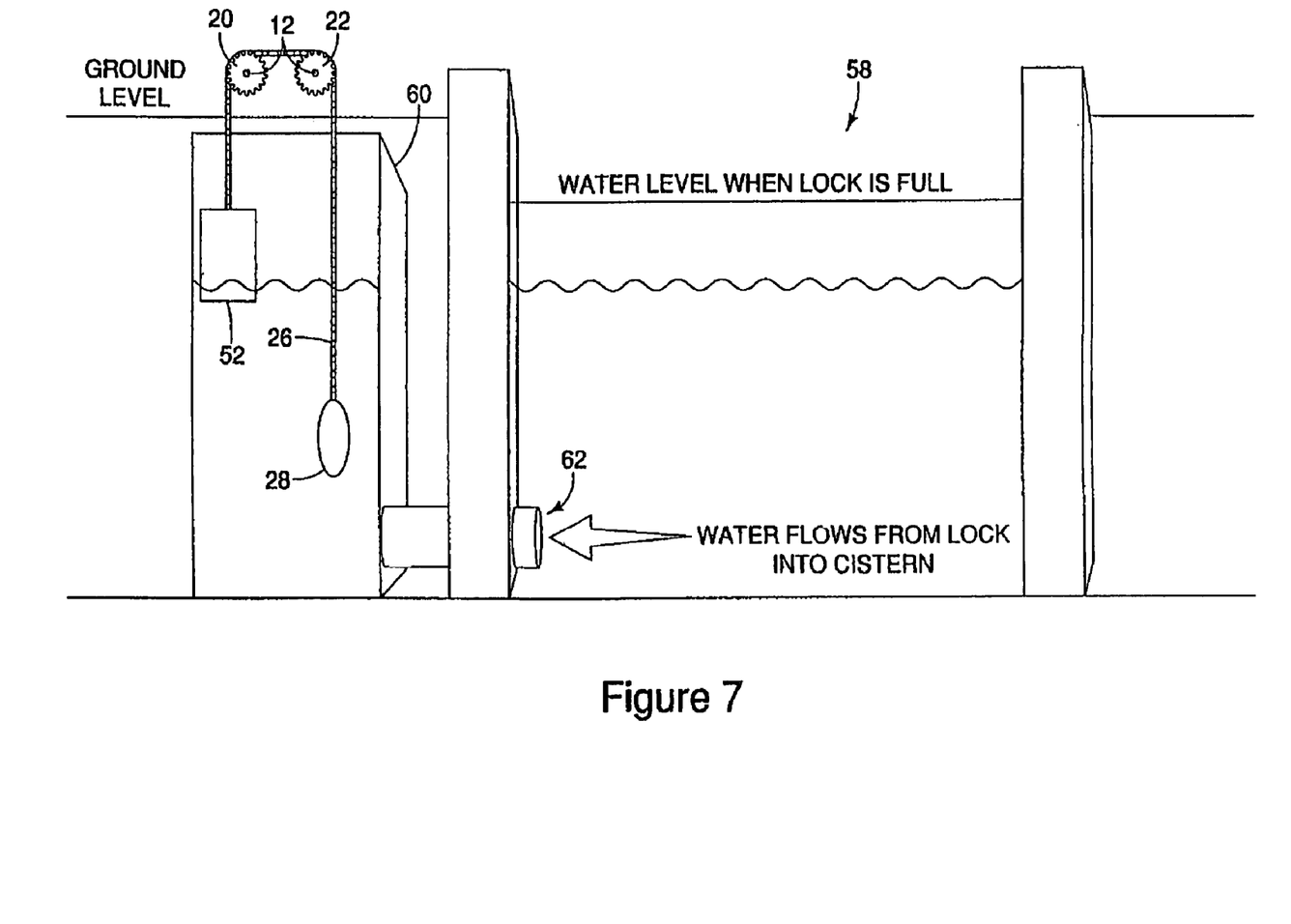
FIG. 7 is a vertical section view through a lock embodiment of the present invention wherein a transmission is mounted in fixed relation over a lock-fed tank and driven by a drive chain having a weight and a float on opposite ends of the chain.

In the further example of FIG. 7, the vertical hydraulic displacement found in the operation of canal locks may be employed using the present invention to create power from the vertical movement of the water in a lock 58 as the lock empties empty and fills during its normal operation. To employ the present invention a vertical cistern 60 similar to the tidal tank of FIG. 3, is constructed alongside the lock, to the full depth of the lock. A pipe 62 interconnects from the bottom of the lock to the bottom of the cistern.

As with tidal tank 44, the cistern is sized to accept a float 52 and counterweight 28 on opposite ends of chain 26, where chain 26 drives one-way clutches 20, 22. Since locks fill and empty relatively quickly, the time for power generation may be very short. The diameter of the connecting pipe 62 may be reduced to maximize the length of time it takes to fill and empty the cistern, thereby increasing the length of time of power generation per cycle of the lock. Thus as the lock fills, the water enters the cistern and the float rises while the counterweight descends. The weight on the chain causes the shaft 12 to rotate and thereby actuate the power generating device. Conversely, as the lock empties, the float, which again, although buoyant has a dead weight greater than that of weight 28, descends while the weight ascends, causing the chain to move in the opposite direction, rotating the shaft and thereby continuously to actuate the power generating device.

As will be apparent to those skilled in the art in the light of the foregoing disclosure, many alterations and modifications are possible in the practice of this invention without departing from the spirit or scope thereof.

What is claimed is:

1. An apparatus for converting energy in a moving fluid mass having a vertically translating fluid surface to rotational energy driving a transmission, the apparatus comprising:

an elongate flexible member having first and second opposite ends, first, second, and third bodies connected to in spaced apart array along said elongate flexible member, wherein said first body is a submerged counter-weight mounted at said first end of said elongate flexible member, said counter-weight submerged in said moving fluid mass between said vertically translating fluid surface and a fixed bottom surface under said vertically translating fluid surface, wherein one of said second or third bodies has a transmission mounted thereto, said transmission including a pair of side-by-side oppositely free-running one-way clutches over which said flexible member is entrained, said one of said second or third bodies generally situate intermediate along said flexible member between said first and second ends and above said vertically translating fluid surface, the other of said second or third bodies at said second end of said flexible member, and having a weight which is greater than the weight of said counter-weight, wherein said one of said second or third bodies is a fixed structure fixedly mounted relative to, and so as to be elevated above said vertically translating fluid surface, and said other of said second or third bodies at said second end of said flexible member is a float for buoyantly floating substantially on said vertically translating fluid surface of said moving fluid mass, wherein said moving fluid mass is a tidally driven body of water and wherein said transmission is adapted to harness a tidal ascent and tidal descent of said float for said driving of said transmission, wherein said adapting of said transmission includes providing a first hollow container having a vertical rise, said float and said counter-weight suspended in said first container, said fixed structure mounted over, so as to cooperate with, said vertical rise of said first container, first fluid communication means communicating a fluid flow between said body of water and a lower end of said first container.

2. The apparatus of claim 1 wherein said first container is a tidal tank.

3. The apparatus of claim 2 further comprising an equalization tank in selective fluid communication with said tidal tank by a second fluid communication means.

4. The apparatus of claim 3 wherein said first and second fluid communication means are pipes, and further comprising valve means cooperating with said pipes for selectively controlling flow into and out of said tidal tank and said equalization tank.

5. The apparatus of claim 4 further comprising control means for selectively controlling actuation of said valve means, wherein said valve means includes a first valve between said tidal tank and said body of water, and a second valve between said tidal tank and said equalization tank, said control means opening said first valve and closing said first valve in controlled succession as a tide floods said body of water so as to repeatedly fill said tidal tank to a level corresponding to an ascending level of said fluid surface of said body of water, while interleaving opening and closing said second valve while said first valve is closed to gradually fill said equalization tank, and so as to reverse the process to gradually drain said equalization tank during an ebb tide lowering said fluid surface of said body of water, whereby said float and counter-weight are vertically oscillated on said flexible member at a frequency corresponding to a rate of said controlled succession and said interleaving.

6. The apparatus of claim 1 wherein said container is a cistern and said fluid mass is contained within a lock.

7. An apparatus for converting energy in a moving fluid mass having a vertically translating fluid surface to rotational energy driving a transmission, the apparatus comprising:
an elongate flexible member having first and second opposite ends,
first, second, and third bodies connected to in spaced apart array along said elongate flexible member,
wherein said first body is a submerged counter-weight mounted at said first end of said elongate flexible member, said counter-weight submerged in said moving fluid mass between said vertically translating fluid surface and a fixed bottom surface under said vertically translating fluid surface,
wherein one of said second or third bodies has a transmission mounted thereto, said transmission including a pair of side-by-side oppositely free-running one-way clutches over which said flexible member is entrained, said one of said second or third bodies generally situate intermediate along said flexible member between said first and second ends and above said vertically translating fluid surface,
the other of said second or third bodies at said second end of said flexible member, and having a weight which is greater than the weight of said counter-weight,
wherein said one of said second or third bodies is a floating structure floating on said vertically translating fluid surface and said other of said second or third bodies at said second end of said flexible member is an anchor weight for resting on said fixed bottom surface under said vertically translating fluid surface of said moving fluid mass,
wherein said floating structure is a watertight pontoon,
wherein said pontoon has a top and sides extending downwardly from said top, and wherein at least one transmission shaft extends from said transmission, and wherein said transmission is mounted within said pontoon and said at least one transmission shaft extends through said sides of said pontoon above said vertically translating fluid surface, wherein said flexible member is said entrained over said at least one transmission shaft and engaged thereon,
wherein said sides of said pontoon taper inwardly and downwardly from said top whereby said flexible member when swaying due to fluid motion of said fluid mass does not interfere with said sides,
wherein said adapting of said transmission includes providing a first hollow container having a vertical rise, said float and said counter-weight suspended in said first container, said fixed structure mounted over, so as to cooperate with, said vertical use of said first container, first fluid communication means communicating a fluid flow between said body of water and a lower end of said first container.

8. An apparatus for converting energy in a moving fluid mass having a vertically translating fluid surface to rotational energy driving a transmission, the apparatus comprising:
an elongate flexible member having first and second opposite ends,
first, second, and third bodies connected to in spaced apart array along said elongate flexible member,
wherein said first body is a submerged counter-weight mounted at said first end of said elongate flexible member, said counter-weight submerged in said moving fluid mass between said vertically translating fluid surface and a fixed bottom surface under said vertically translating fluid surface,
wherein one of said second or third bodies has a transmission mounted thereto, said transmission including a pair of side-by-side oppositely free-running one-way clutches over which said flexible member is entrained, said one of said second or third bodies generally situate intermediate along said flexible member between said first and second ends and above said vertically translating fluid surface,
the other of said second or third bodies at said second end of said flexible member, and having a weight which is greater than the weight of said counter-weight,
wherein said one of said second or third bodies is a floating structure floating on said vertically translating fluid surface and said other of said second or third bodies at said second end of said flexible member is an anchor weight for resting on said fixed bottom surface under said vertically translating fluid surface of said moving fluid mass,
wherein said floating structure is a watertight pontoon,
wherein said pontoon has a top and sides extending downwardly from said top, and wherein at least one transmission shaft extends from said transmission, and wherein said transmission is mounted within said pontoon and said at least one transmission shaft extends through said sides of said pontoon above said vertically translating fluid surface, wherein said flexible member is said entrained over said at least one transmission shaft and engaged thereon,
wherein said at least one transmission shaft has said clutches mounted thereon at distal ends thereof for engaging said flexible member,
said at least one transmission shaft is a pair of transmission shafts and wherein said clutches are mounted on said pair of transmission shafts,
wherein said pair of transmission shafts are substantially parallel,
further comprising an equalization tank in selective fluid communication with said tidal tank by a second fluid communication means.

9. An apparatus for converting energy in a moving fluid mass having a vertically translating fluid surface to rotational energy driving a transmission, the apparatus comprising:
an elongate flexible member having first and second opposite ends,
first, second, and third bodies connected to in spaced apart array along said elongate flexible member,
wherein said first body is a submerged counter-weight mounted at said first end of said elongate flexible member, said counter-weight submerged in said moving fluid mass between said vertically translating fluid surface and a fixed bottom surface under said vertically translating fluid surface,
wherein one of said second or third bodies has a transmission mounted thereto, said transmission including a pair of side-by-side oppositely free-running one-way clutches over which said flexible member is entrained, said one of said second or third bodies generally situate intermediate along said flexible member between said first and second ends and above said vertically translating fluid surface, the other of said second or third bodies at said second end of said flexible member, and having a weight which is greater than the weight of said counter-weight, wherein said one of said second or third bodies is a floating structure floating on said vertically translating fluid surface and said other of said second or third bodies at said second end of said flexible member is an anchor weight for resting on said fixed bottom surface under said vertically translating fluid surface of said moving fluid mass, wherein said floating structure is a watertight pontoon, wherein said pontoon has a top and sides extending downwardly from said top, and wherein at least one transmission shaft extends from said transmission, and wherein said transmission is mounted within said pontoon and said at least one transmission shaft extends through said sides of said pontoon above said vertically translating fluid surface, wherein said flexible member is said entrained over said at least one transmission shaft and engaged thereon, wherein said sides of said pontoon taper inwardly and downwardly from said top whereby said flexible member when swaying due to fluid motion of said fluid mass does not interfere with said sides, wherein said transmission includes a plurality of transmissions, and further comprises a plurality of generators wherein each said transmission of said plurality of transmissions cooperates with a corresponding generator of said plurality of generators, and wherein said each transmission includes a corresponding said transmission shaft and corresponding said flexible member having corresponding said anchor weight and said counter-weight, wherein said first and second fluid communication means are pipes, and further comprising valve means cooperating with said pipes for selectively controlling flow into and out of said tidal tank and said equalization tank.

10. An apparatus for converting energy in a moving fluid mass having a vertically translating fluid surface to rotational energy driving a transmission, the apparatus comprising:

an elongate flexible member having first and second opposite ends, first, second, and third bodies connected to in spaced apart array along said elongate flexible member, wherein said first body is a submerged counter-weight mounted at said first end of said elongate flexible member, said counter-weight submerged in said moving fluid mass between said vertically translating fluid surface and a fixed bottom surface under said vertically translating fluid surface, wherein one of said second or third bodies has a transmission mounted thereto, said transmission including a pair of side-by-side oppositely free-running one-way clutches over which said flexible member is entrained, said one of said second or third bodies generally situate intermediate along said flexible member between said first and second ends and above said vertically translating fluid surface, the other of said second or third bodies at said second end of said flexible member, and having a weight which is greater than the weight of said counter-weight, wherein said one of said second or third bodies is a floating structure floating on said vertically translating fluid surface and said other of said second or third bodies at said second end of said flexible member is an anchor weight for resting on said fixed bottom surface under said vertically translating fluid surface of said moving fluid mass, wherein said floating structure is a watertight pontoon, wherein said pontoon has a top and sides extending downwardly from said top, and wherein at least one transmission shaft extends from said transmission, and wherein said transmission is mounted within said pontoon and said at least one transmission shaft extends through said sides of said pontoon above said vertically translating fluid surface, wherein said flexible member is said entrained over said at least one transmission shaft and engaged thereon, wherein said sides of said pontoon taper inwardly and downwardly from said top whereby said flexible member when swaying due to fluid motion of said fluid mass does not interfere with said sides, wherein said transmission includes a plurality of transmissions, and further comprises a plurality of generators wherein each said transmission of said plurality of transmissions cooperates with a corresponding generator of said plurality of generators, and wherein said each transmission includes a corresponding said transmission shaft and corresponding said flexible member having corresponding said anchor weight and said counter-weight, wherein said plurality of said transmission shafts extend from said sides of said pontoon on opposite said sides of said pontoon, further comprising control means for selectively controlling actuation of said valve means, wherein said valve means includes a first valve between said tidal tank and said body of water, and a second valve between said tidal tank and said equalization tank, said control means opening said first valve and closing said first valve in controlled succession as a tide floods said body of water so as to repeatedly fill said tidal tank to a level corresponding to an ascending level of said fluid surface of said body of water, while interleaving opening and closing said second valve while said first valve is closed to gradually fill said equalization tank, and so as to reverse the process to gradually drain said equalization tank during an ebb tide lowering said fluid surface of said body of water, whereby said float and counter-weight are vertically oscillated on said flexible member at a frequency corresponding to a rate of said controlled succession and said interleaving.

11. An apparatus for converting energy in a moving fluid mass having a vertically translating fluid surface to rotational energy driving a transmission, the apparatus comprising:

an elongate flexible member having first and second opposite ends, first, second, and third bodies connected to in spaced apart array along said elongate flexible member, wherein said first body is a submerged counter-weight mounted at said first end of said elongate flexible member, said counter-weight submerged in said moving fluid mass between said vertically translating fluid surface and a fixed bottom surface under said vertically translating fluid surface, wherein one of said second or third bodies has a transmission mounted thereto, said transmission including a pair of side-by-side oppositely free-running one-way clutches over which said flexible member is entrained, said one of said second or third bodies generally situate intermediate along said flexible member between said first and second ends and above said vertically translating fluid surface, the other of said second or third bodies at said second end of said flexible member, and having a weight which is greater than the weight of said counter-weight, wherein said one of said second or third bodies is a floating structure floating on said vertically translating fluid surface and said other of said second or third bodies at said second end of said flexible member is an anchor weight for resting on said fixed bottom surface under said vertically translating fluid surface of said moving fluid mass, wherein said floating structure is a watertight pontoon, wherein said pontoon has a top and sides extending downwardly from said top, and wherein at least one transmission shaft extends from said transmission, and wherein said transmission is mounted within said pontoon and said at least one transmission shaft extends through said sides of said pontoon above said vertically translating fluid surface, wherein said flexible member is said entrained over said at least one transmission shaft and engaged thereon, further comprising a hollow container having a vertical rise, said float and said counter-weight suspended in said container, said fixed structure mounted over so as to cooperate with said vertical rise of said container, fluid communication means communicating a fluid flow between said moving fluid mass and a lower end of said container.

* * * * *